(12) United States Patent
Sharifi et al.

(10) Patent No.: US 12,137,132 B2
(45) Date of Patent: Nov. 5, 2024

(54) METHODS, SYSTEMS, AND MEDIA FOR RECOMMENDING CONTENT BASED ON NETWORK CONDITIONS

(71) Applicant: Google LLC, Mountain View, CA (US)

(72) Inventors: Matthew Sharifi, Kilchberg (CH); Jakob Nicolaus Foerster, Zurich (CH)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 17/205,503

(22) Filed: Mar. 18, 2021

(65) Prior Publication Data

US 2021/0211476 A1    Jul. 8, 2021

Related U.S. Application Data

(63) Continuation of application No. 15/188,527, filed on Jun. 21, 2016, now Pat. No. 10,958,695.

(51) Int. Cl.
*H04L 67/52* (2022.01)
*H04L 65/61* (2022.01)
(Continued)

(52) U.S. Cl.
CPC .............. *H04L 65/61* (2022.05); *H04L 67/52* (2022.05); *H04L 67/535* (2022.05);
(Continued)

(58) Field of Classification Search
CPC ... H04W 4/029; H04W 4/02; G06F 16/90324; G06F 16/9577; G06F 16/743;
(Continued)

(56) References Cited

U.S. PATENT DOCUMENTS 6,665,002 B2    12/2003    Liu
6,868,224 B1 *    3/2005    Birmingham .......... H04N 5/783
                                                        386/E5.052
(Continued)

FOREIGN PATENT DOCUMENTS

CN    101464881    6/2009
CN    101828224    9/2010
(Continued)

OTHER PUBLICATIONS

Examination Report dated Mar. 19, 2020 in EP Patent Application No. 16828814.0.
(Continued)

*Primary Examiner* — Dhairya A Patel
*Assistant Examiner* — Sandarva Khanal
(74) *Attorney, Agent, or Firm* — Shumaker & Sieffert, P.A.

(57) ABSTRACT

In some embodiments, a method for recommending content based on network conditions comprises: receiving, from a first user device, a request to present media content recommendations on the first user device; in response to receiving the request, determining information indicating a user context associated with the first user device and network connectivity information associated with a connection status of the first user device over a communications network; identifying a group of media content items to recommend based on the user context and the network connectivity information; and causing recommendations for the group of media content items to be presented on the first user device.

21 Claims, 5 Drawing Sheets

(51) Int. Cl.
    *H04L 67/50*           (2022.01)
    *H04N 21/2343*      (2011.01)
    *H04N 21/258*       (2011.01)
    *H04N 21/442*       (2011.01)
    *H04N 21/482*       (2011.01)
    *H04N 21/6377*      (2011.01)
    *H04N 21/658*       (2011.01)

(52) U.S. Cl.
    CPC . *H04N 21/23439* (2013.01); *H04N 21/25808* (2013.01); *H04N 21/44209* (2013.01); *H04N 21/4826* (2013.01); *H04N 21/4828* (2013.01); *H04N 21/6377* (2013.01); *H04N 21/6581* (2013.01)

(58) Field of Classification Search
    CPC ............ G06F 16/4387; G06F 3/04842; G06F 3/0481; G06Q 30/0631; H04N 21/4826; H04N 21/23439; H04N 21/4667; H04N 21/466; H04N 21/4668; H04N 21/2408; H04N 21/44222; H04N 21/47202; H04N 21/4532; H04L 67/535; H04L 65/61; H04L 67/52; H04L 67/62
    See application file for complete search history.

(56) References Cited

U.S. PATENT DOCUMENTS

| | | | | |
|---|---|---|---|---|
| 8,776,109 | B2* | 7/2014 | Mallika | H04N 21/4622 |
| | | | | 725/32 |
| 8,792,347 | B2 | 7/2014 | Swenson et al. | |
| 8,855,469 | B2* | 10/2014 | Maharajh | G06Q 30/0267 |
| | | | | 386/205 |
| 8,966,370 | B2 | 2/2015 | Steiner | |
| 8,977,776 | B1 | 3/2015 | Lee et al. | |
| 9,460,220 | B1 | 10/2016 | Jenkins et al. | |
| 10,356,199 | B2* | 7/2019 | Raleigh | H04L 67/562 |
| 10,958,695 | B2 | 3/2021 | Sharifi et al. | |
| 2004/0048637 | A1 | 3/2004 | Atkinson | H04M 9/08 |
| | | | | 455/456.1 |
| 2005/0097615 | A1 | 5/2005 | Moradi et al. | |
| 2007/0081586 | A1* | 4/2007 | Raveendran | H04N 19/30 |
| | | | | 375/240.1 |
| 2007/0081597 | A1* | 4/2007 | Disch | H04S 3/008 |
| | | | | 375/242 |
| 2007/0206505 | A1* | 9/2007 | Forbes | H04M 7/0072 |
| | | | | 370/252 |
| 2007/0250901 | A1 | 10/2007 | McIntire et al. | |
| 2008/0201748 | A1* | 8/2008 | Hasek | G06F 21/10 |
| | | | | 725/111 |
| 2009/0097664 | A1* | 4/2009 | Archibald | H04R 3/002 |
| | | | | 381/56 |
| 2010/0058390 | A1 | 3/2010 | Harris et al. | |
| 2010/0235542 | A1* | 9/2010 | Visharam | H04N 21/6587 |
| | | | | 709/246 |
| 2010/0328529 | A1* | 12/2010 | Hirayama | H04N 7/0132 |
| | | | | 348/E7.003 |
| 2011/0212756 | A1 | 9/2011 | Packard et al. | |
| 2012/0092991 | A1 | 4/2012 | Jeong et al. | |
| 2012/0159337 | A1* | 6/2012 | Travilla | G06Q 30/0631 |
| | | | | 715/738 |
| 2012/0259950 | A1 | 10/2012 | Havekes et al. | |
| 2012/0303362 | A1* | 11/2012 | Duni | G10L 19/22 |
| | | | | 704/226 |
| 2013/0060641 | A1 | 3/2013 | Al Gharabally | |
| 2013/0125155 | A1* | 5/2013 | Bhagavathy | H04N 21/24 |
| | | | | 725/10 |
| 2013/0144750 | A1 | 6/2013 | Brown | |
| 2013/0160062 | A1* | 6/2013 | Carney | H04N 21/2362 |
| | | | | 725/95 |
| 2013/0238751 | A1 | 9/2013 | Raleigh et al. | |
| 2013/0275610 | A1* | 10/2013 | Mahajan | H04N 21/64322 |
| | | | | 709/231 |
| 2014/0079118 | A1* | 3/2014 | Dedeoglu | H04N 19/124 |
| | | | | 375/240.08 |
| 2014/0270699 | A1* | 9/2014 | Casey | H04N 9/8211 |
| | | | | 386/241 |
| 2014/0278308 | A1 | 9/2014 | Liu et al. | |
| 2014/0365759 | A1* | 12/2014 | Wang | H04L 63/0428 |
| | | | | 713/151 |
| 2015/0003797 | A1* | 1/2015 | Schmidt | G11B 27/031 |
| | | | | 386/201 |
| 2015/0127340 | A1* | 5/2015 | Epshteyn | G10L 21/00 |
| | | | | 704/235 |
| 2015/0135225 | A1 | 5/2015 | Bayer et al. | |
| 2015/0281299 | A1* | 10/2015 | Moustafa | H04L 65/756 |
| | | | | 709/219 |
| 2015/0348122 | A1 | 12/2015 | Cornell et al. | |
| 2015/0350276 | A1* | 12/2015 | Karlsson | H04N 21/44004 |
| | | | | 709/231 |
| 2015/0364144 | A1* | 12/2015 | Fuchs | G10L 19/012 |
| | | | | 704/500 |
| 2015/0379132 | A1 | 12/2015 | Cho | |
| 2015/0382030 | A1 | 12/2015 | Rieger et al. | |
| 2016/0029057 | A1 | 1/2016 | Wickenkamp | |
| 2016/0080237 | A1 | 3/2016 | Halepovic et al. | |
| 2016/0088101 | A1 | 3/2016 | Batiste et al. | |
| 2016/0105506 | A1 | 4/2016 | Gilson | |
| 2016/0173388 | A1 | 6/2016 | Alam et al. | |
| 2017/0085959 | A1* | 3/2017 | Fithian | H04N 21/6377 |
| 2017/0149855 | A1* | 5/2017 | Doshi | H04N 21/222 |
| 2017/0171271 | A1* | 6/2017 | Kelly | H04L 65/611 |
| 2017/0178409 | A1* | 6/2017 | Bloch | H04N 21/44218 |
| 2017/0270122 | A1 | 9/2017 | He et al. | |

FOREIGN PATENT DOCUMENTS

| | | | | |
|---|---|---|---|---|
| CN | 102144241 | A | 8/2011 | |
| CN | 102523489 | A | 6/2012 | |
| CN | 103221955 | | 7/2013 | |
| CN | 103729363 | | 4/2014 | |
| CN | 104488231 | A | 4/2015 | |
| CN | 104580019 | A | 4/2015 | |
| EP | 0675495 | A2 * | 3/1995 | |
| EP | 2357819 | A1 | 8/2011 | |
| EP | 2717566 | A2 * | 4/2014 | ........... G11B 27/105 |
| EP | 2779666 | | 9/2014 | |
| WO | WO-2005112365 | A1 * | 11/2005 | ........... H04L 1/0014 |
| WO | WO 2013003631 | | 1/2013 | |
| WO | WO-2014106168 | A1 * | 7/2014 | ........... G06F 16/958 |

OTHER PUBLICATIONS

International Search Report and Written Opinion dated Mar. 29, 2017 in United States Patent Application No. PCT/US2016/065841.
Notice of Allowance dated Nov. 17, 2020 in U.S. Appl. No. 15/188,527.
Office Action dated Feb. 6, 2020 in U.S. Appl. No. 15/188,527.
Office Action dated Mar. 21, 2018 in U.S. Appl. No. 15/188,527.
Office Action dated Jul. 15, 2020 in U.S. Appl. No. 15/188,527.
Office Action dated Sep. 19, 2019 in U.S. Appl. No. 15/188,527.
Office Action dated Oct. 24, 2018 in U.S. Appl. No. 15/188,527.
Office Action dated Nov. 13, 2020 in CN Patent Application No. 201680083534.2.
Communication pursuant to Rules 161(1) and 162 EPC from counterpart European Application No. 16828814.0 dated Sep. 28, 2018, 3 pp.
International Preliminary Report on Patentability from International Application No. PCT/US2016/065841 dated Dec. 25, 2018, 7 pp.
Notice of Intent to Grant and Text Intended to Grant from counterpart European Application No. 16828814.0 dated Sep. 15, 2020, 8 pp.
Prosecution History from U.S. Appl. No. 15/188,527, now issued U.S. Pat. No. 10,958,695, dated Mar. 21, 2018 through Nov. 17, 2020, 211 pp.
Response to Communication pursuant to Article 94(3) EPC dated Mar. 19, 2020, from counterpart European Application No. 16828814.0 filed May 14, 2020, 10 pp.

(56) References Cited

OTHER PUBLICATIONS

Response to Communication Pursuant to Rules 161(1) and 162 EPC dated Sep. 28, 2018, from counterpart European Application No. 16828814.0, filed Mar. 11, 2019, 15 pp.

* cited by examiner

METHODS, SYSTEMS, AND MEDIA FOR RECOMMENDING CONTENT BASED ON NETWORK CONDITIONS

CROSS-REFERENCE TO RELATED APPLICATION

This application is a continuation of U.S. patent application Ser. No. 15/188,527, filed Jun. 21, 2016, which is hereby incorporated by reference herein in its entirety.

TECHNICAL FIELD

The disclosed subject matter relates to methods, systems, and media for recommending content based on network conditions.

BACKGROUND

People often view media content (such as videos, movies, television programs, etc.) on devices, and this media content is frequently streamed from a content server. Different media content may ideally be viewed with higher resolution. For example, certain movies or television programs may ideally be viewed with a higher video resolution. However, it may be difficult to stream media content with higher resolution to a user device if the user device has a slow or unreliable network connection.

Accordingly, it is desirable to provide new methods, systems, and media for recommending content based on network conditions.

SUMMARY

Methods, systems, and media for recommending content based on network conditions are provided.

In accordance with some embodiments of the disclosed subject matter, a method for recommending content based on network conditions is provided, the method comprising: receiving, from a first user device, a request to present media content recommendations on the first user device; in response to receiving the request, determining information indicating a user context associated with the first user device and network connectivity information associated with a connection status of the first user device over a communications network; identifying a group of media content items to recommend based on the user context and the network connectivity information; and causing recommendations for the group of media content items to be presented on the first user device.

In some embodiments, identifying the group of media content items to recommend comprises: identifying a group of candidate media content items; scoring each candidate media content item in the group of media content items based on viewing metrics for the candidate media content item, wherein the viewing metrics are based on a plurality of viewing sessions corresponding to a plurality of user devices not including the first user device; and selecting the group of media content items from the group of candidate media content items based on the score of each candidate media content item.

In some embodiments, the viewing metrics indicate an average portion of each media content item that was presented on the plurality of user devices before presentation of each media content item was stopped.

In some embodiments, scoring each candidate media content item in the group of media content items is further based on network connectivity information for each user device in the plurality of user devices, and wherein the group of media content items is selected based on viewing metrics for the candidate media content items that were viewed by user devices in the plurality of user devices with a similar connection status as the network connection status of the first user device.

In some embodiments, the user context associated with the first user device indicates a current location of the first user device.

In some embodiments, the user context associated with the first user device indicates a current activity of a user of the first user device.

In some embodiments, the network connectivity information associated with a connection status of the first user device indicates a type of connection of the first user device to a network used to stream media content on the first user device.

In accordance with some embodiments of the disclosed subject matter, a system for recommending content based on network conditions is provided, the system comprising a hardware processor that is configured to: receive, from a first user device, a request to present media content recommendations on the first user device; in response to receiving the request, determine information indicating a user context associated with the first user device and network connectivity information associated with a connection status of the first user device; identify a group of media content items to recommend based on the user context and the network connectivity information; and cause recommendations for the group of media content items to be presented on the first user device.

In accordance with some embodiments of the disclosed subject matter, a nontransitory computer-readable medium containing computer executable instructions that, when executed by a processor, cause the processor to perform a method for recommending content based on network conditions is provided, the method comprising: receiving, from a first user device, a request to present media content recommendations on the first user device; in response to receiving the request, determining information indicating a user context associated with the first user device and network connectivity information associated with a connection status of the first user device over a communications network; identifying a group of media content items to recommend based on the user context and the network connectivity information; and causing recommendations for the group of media content items to be presented on the first user device.

In accordance with some embodiments of the disclosed subject matter, a system for recommending content based on network conditions is provided, the system comprising: means for receiving, from a first user device, a request to present media content recommendations on the first user device; in response to receiving the request, means for determining information indicating a user context associated with the first user device and network connectivity information associated with a connection status of the first user device over a communications network; means for identifying a group of media content items to recommend based on the user context and the network connectivity information; and means for causing recommendations for the group of media content items to be presented on the first user device.

In accordance with some embodiments of the disclosed subject matter, a method for adaptively streaming a content item is provided, the method comprising: receiving an indication of a content item to be streamed on a user device; in response to receiving the indication, determining information indicating a user context associated with the user device and network connectivity information associated with a connection status of the user device over a communications network; identifying a first portion of the content item that is to be presented with a first resolution based on media content information and the network connectivity information; identifying a second portion of the content item that is to be presented with a second resolution based on the media content information and the network connectivity information, wherein the first resolution is lower than the second resolution; transmitting the first portion of the content item to the user device; while causing the first portion of the content item to be presented on the user device, transmitting the second portion of the content item to the user device; and causing the second portion of the content item to be presented on the user device.

In some embodiments, identifying the first portion of the content item that is to be presented with the first resolution and identifying the second portion of the content item that is to be presented with the second resolution is based on visual content of the first portion of the content item and the second portion of the content item.

In some embodiments, the method further comprises identifying a scene transition within the content item, wherein the first portion of the content item and the second portion of the content item are separated by the scene transition.

In some embodiments, identifying the first portion of the content item that is to be presented with the first resolution and identifying the second portion of the content item that is to be presented with the second resolution is based on captions associated with the content item.

In some embodiments, the method further comprises identifying a subset of the second portion of the content item to be transmitted to the user device based on viewing metrics associated with the content item.

In some embodiments, the viewing metrics include an average portion of the content item that was presented on a plurality of user devices other than the user device before presentation of the content item was stopped.

In some embodiments, the method further comprises creating a file that indicates a first location of the first portion of the content item at the first resolution and a second location of the second portion of the content item at the second resolution, wherein the transmitting the first portion of the content item to the user device and the transmitting the second portion of the content item to the user device is based on the created file.

In accordance with some embodiments of the disclosed subject matter, a system for adaptively streaming a content item is provided, the system comprising a hardware processor that is configured to: receive an indication of a content item to be streamed on a user device; in response to receiving the indication, determine information indicating a user context associated with the user device and network connectivity information associated with a connection status of the user device over a communications network; identify a first portion of the content item that is to be presented with a first resolution based on media content information and the network connectivity information; identify a second portion of the content item that is to be presented with a second resolution based on the media content information and the network connectivity information, wherein the first resolution is lower than the second resolution; transmit the first portion of the content item to the user device; while causing the first portion of the content item to be presented on the user device, transmit the second portion of the content item to the user device; and cause the second portion of the content item to be presented on the user device.

In accordance with some embodiments of the disclosed subject matter, a nontransitory computer-readable medium containing computer executable instructions that, when executed by a processor, cause the processor to perform a method for adaptively streaming a content item is provided, the method comprising: receiving an indication of a content item to be streamed on a user device; in response to receiving the indication, determining information indicating a user context associated with the user device and network connectivity information associated with a connection status of the user device over a communications network; identifying a first portion of the content item that is to be presented with a first resolution based on media content information and the network connectivity information; identifying a second portion of the content item that is to be presented with a second resolution based on the media content information and the network connectivity information, wherein the first resolution is lower than the second resolution; transmitting the first portion of the content item to the user device; while causing the first portion of the content item to be presented on the user device, transmitting the second portion of the content item to the user device; and causing the second portion of the content item to be presented on the user device.

In accordance with some embodiments of the disclosed subject matter, a system for adaptively streaming a content item is provided, the system comprising: means for receiving an indication of a content item to be streamed on a user device; in response to receiving the indication, means for determining information indicating a user context associated with the user device and network connectivity information associated with a connection status of the user device over a communications network; means for identifying a first portion of the content item that is to be presented with a first resolution based on media content information and the network connectivity information; means for identifying a second portion of the content item that is to be presented with a second resolution based on the media content information and the network connectivity information, wherein the first resolution is lower than the second resolution; means for transmitting the first portion of the content item to the user device; while causing the first portion of the content item to be presented on the user device, means for transmitting the second portion of the content item to the user device; and means for causing the second portion of the content item to be presented on the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
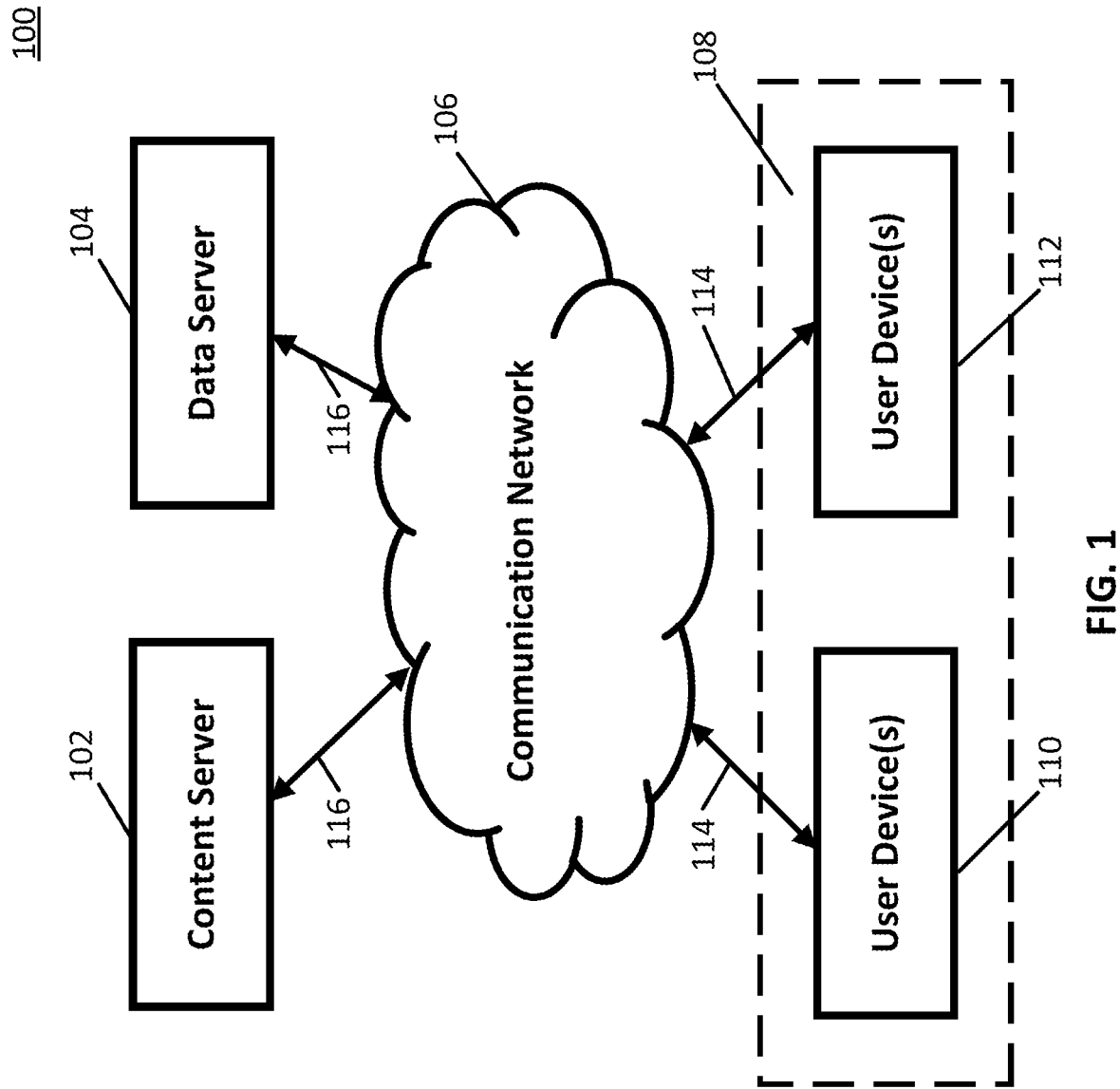
FIG. 1 shows a schematic diagram of an example of a system for recommending content based on network conditions in accordance with some embodiments of the disclosed subject matter.

In accordance with various embodiments, mechanisms (which can include methods, systems, and media) for recommending content based on network conditions are provided.

In some embodiments, the mechanisms described herein can determine network connectivity information associated with a connection of a user device to a communications network and can identify media content to recommend for viewing on the user device based on the network connectivity information. The network connectivity information can indicate any information about a network connection, such as a bandwidth of the connection, a speed of the connection, a type of connection (e.g., a 3G connection, a 4G connection, a DSL connection, a dial-up connection, and/or any other suitable type of connection), and/or any other suitable connection information. In some embodiments, the mechanisms can identify media content that is to be recommended for viewing on the media device based on whether the media content is ideally viewed with a relatively higher resolution or is suitable to be viewed with a relatively lower resolution. For example, in instances where the network connectivity information indicates a slower and/or less reliable network connection, the mechanisms can recommend media content that is suitable for viewing with a relatively lower resolution. As another example, in instances where the network connectivity information indicates a faster and/or a more reliable network connection, the mechanisms can recommend media content that is ideally viewed with a higher resolution. Note that, in some embodiments, resolution of a media content item can refer to spatial resolution (e.g., a number of pixels per frame, and/or any other suitable metric of spatial resolution) and/or temporal resolution (e.g., a number of frames or samples per second, and/or any other suitable metric of temporal resolution). Note that, in some embodiments, the network connectivity information can be updated at any suitable time(s) and/or any suitable time intervals, and the mechanisms can use the most recently determined network connectivity information to identify the media content, as described below in connection with FIG. 3.

The mechanisms described herein can identify the media content using any suitable information and technique(s). For example, in some embodiments, the mechanisms can identify a first media content item likely to be of interest to a user of the user device. The mechanisms can then identify a group of media content items similar to the first media content item and can calculate viewing metrics for the group of media content items across multiple viewing sessions for multiple other users under different network conditions. For example, the viewing metrics can indicate that users viewing media content items in the group of media content items under relatively poor network conditions (e.g., a slow download speed, an unreliable connection, and/or any other suitable network condition) tended to view a small portion of the media content items (e.g., 10%, 20%, and/or any other suitable proportion) or a short duration of the media content items before navigating away from presentation of the media content item. Continuing this example, the mechanisms can then determine that the media content items in the group of media content items would likely benefit from being viewed under better network conditions because the media content items would likely be more enjoyable when presented with higher resolution, and could therefore determine that the media content items are to be recommended on user devices when connected with more reliable and/or faster network connections.

It should be noted that, in some embodiments, the mechanisms can be used to determine normalized viewing metrics for the group of media content items. For example, the mechanisms can determine that watching a particular portion of the media content items (e.g., 10%, 20%, etc.) of long-form video content is normal. In continuing this example, the mechanisms can determine that a media content item having an expected watch time similar to the normalized viewing metrics (e.g., 10%) can be recommended for consumption on a user device having particular network connectivity information.

Additionally or alternatively, in some embodiments, the mechanisms described herein can adaptively stream media content to the user device based on the network connectivity information. For example, in some embodiments, the mechanisms can identify portions of a media content item being presented on the user device that are suitable to be presented with lower resolution and other portions of the media content item that would benefit from being presented with higher resolution. The mechanisms can then cause the portions to be presented with higher resolution to be transmitted to the user device during playback of the portions presented with lower resolution, thereby allowing the mechanisms to optimally use bandwidth used for streaming the media content item. The mechanisms can identify the portions of the media content item to be presented with lower and higher resolution using any suitable technique or combination of techniques, such as identifying transitions in scenes, identifying video content likely to be interesting or important, and/or any other suitable techniques, as described below in connection with FIG. 5.

Turning to FIG. 1, an example 100 of hardware for recommending content based on network conditions that can be used in accordance with some embodiments of the disclosed subject matter is shown. As illustrated, hardware 100 can include one or more servers, such as a content server 102, a data server 104, a communication network 106, and one or more user devices 108.

Content server 102 can be any suitable server for storing content items and delivering the content items to a user device 108 in some embodiments. For example, content server 102 can be a server that streams content items to user device 108 via communication network 106. As a more particular example, in some embodiments, content server 102 can stream a content item to user device 108 in response to receiving a request for the content item from user device 108. Content provided by content server 102 can be any suitable content, such as video content, audio content, television programs, movies, cartoons, sound effects, audiobooks, web pages, news articles, streaming live content (e.g., a streaming radio show, a live concert, and/or any other suitable type of streaming live content), electronic books, search results and/or any other suitable type of content.

Content can be created and uploaded to content server 102 by any suitable entity. In some embodiments, content server 102 can be omitted.

Data server 104 can be any suitable server for identifying content to recommend based on network connectivity information of a user device. For example, in some embodiments, data server 104 can determine that the user device is connected to a communication network with relatively high bandwidth and can therefore stream content that would benefit from a relatively high video resolution. In some such embodiments, data server 104 can then select content items that would benefit from presentation with a relatively high video resolution and cause the content items to be recommended on the user device. In some embodiments, data server 104 can use any suitable information and techniques to identify the content, as shown in and described below in connection with FIGS. 3 and 4. Additionally or alternatively, in some embodiments, data server 104 can implement any suitable techniques to adaptively stream content to the user device by causing portions of a content item to be transmitted with higher resolution during playback on the user device of portions of the content item that do not require higher resolution, as shown in and described below in connection with FIG. 5. In some embodiments, data server 104 can be omitted.

Communication network 106 can be any suitable combination of one or more wired and/or wireless networks in some embodiments. For example, communication network 106 can include any one or more of the Internet, a mobile data network, a satellite network, a local area network, a wide area network, a telephone network, a cable television network, a WiFi network, a WiMax network, and/or any other suitable communication network.

User device(s) 108, such as user device(s) 110 and/or user device(s) 112, can include any one or more user devices suitable for presenting recommendations of media content, presenting media content, and/or performing any other suitable functions. For example, in some embodiments, user device(s) 108 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 108 can include non-mobile devices such as a desktop computer, a set-top box, a television, a streaming media player, a game console, or any other suitable non-mobile device. User devices 108 can be connected by one or more communications links 114 to communication network 106 that can be linked via communications links 116 to content server 102 and/or data server 104.

Although content server 102 and data server 104 are illustrated as separate devices, any one or more of these devices can be combined into one device in some embodiments. Also, although only one each of content server 102 and data server 104 are shown in FIG. 1 to avoid over-complicating the figure, any suitable one or more of each device can be used in some embodiments.

Although only one user device 108 is shown in FIG. 1 to avoid over-complicating the figure, any suitable number of each of these devices, and any suitable types of these devices, can be used in some embodiments.

Figure 2:
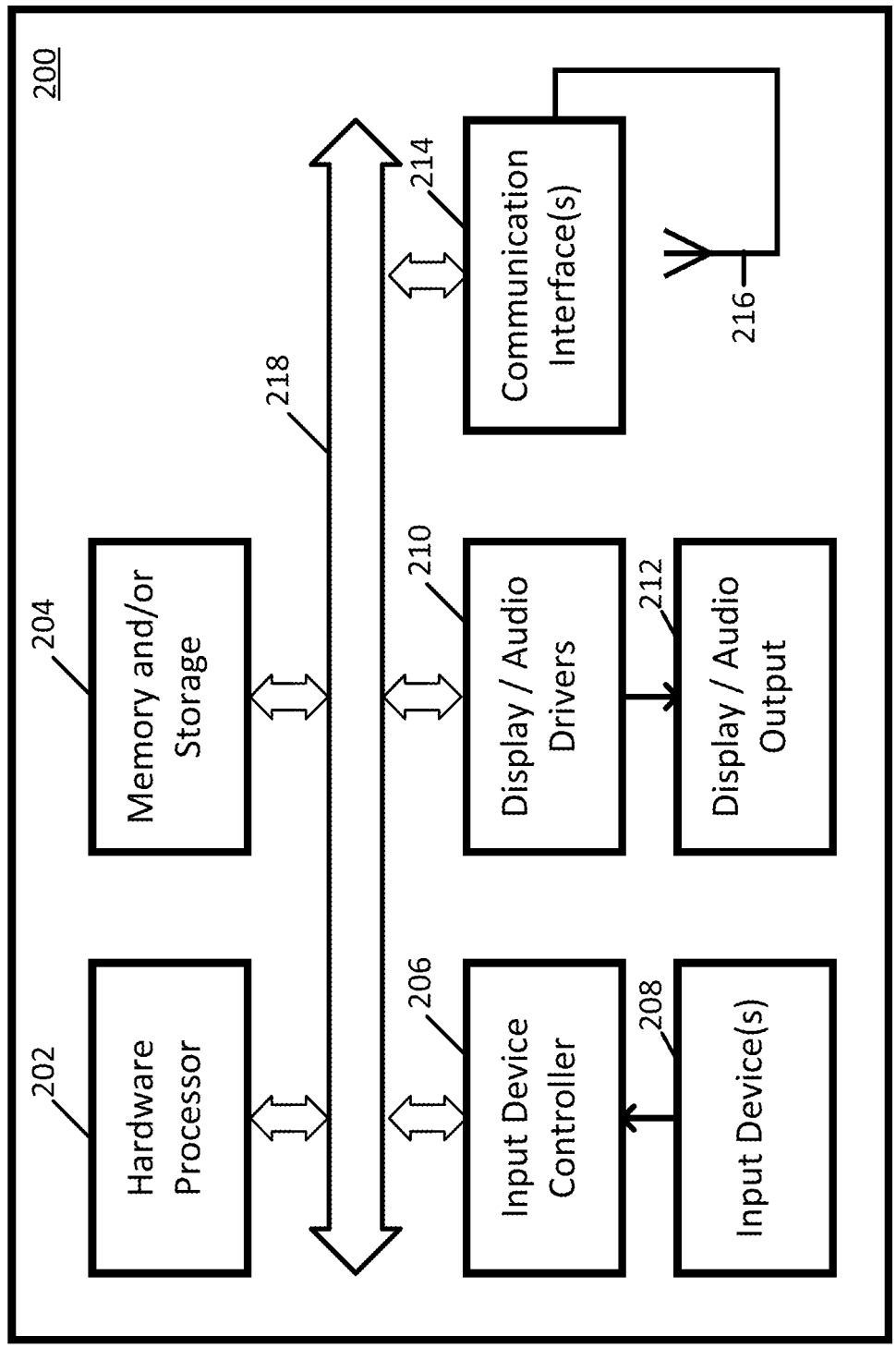
FIG. 2 shows an example of hardware that can be used in a server and/or a user device in accordance with some embodiments of the disclosed subject matter.

Content server 102, data server 104, and user device 108 can be implemented using any suitable hardware in some embodiments. For example, in some embodiments, devices 102, 104, and 108 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 106 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
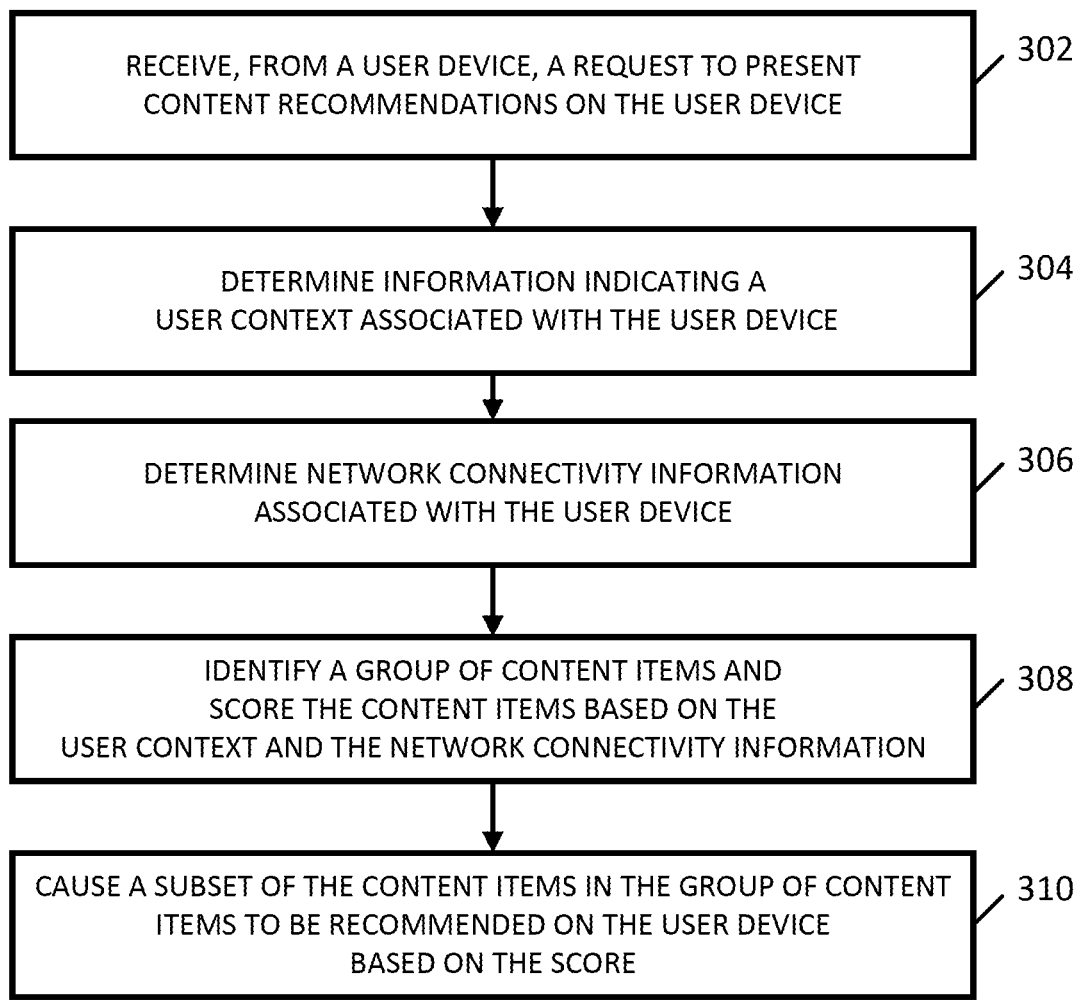
FIG. 3 shows an example of a process for selecting content based on user context and network connectivity information in accordance with some embodiments of the disclosed subject matter.

Turning to FIG. 3, an example 300 of a process for selecting content to recommend to a user based on network connectivity information is shown in accordance with some embodiments of the disclosed subject matter.

Process 300 can begin by receiving, from a user device, an indication to present content recommendations on the user device at 302. The indication can be received in response to any information. For example, in some embodiments, process 300 can determine that content recommendations are to be presented in response to determining that the user device has navigated to a particular web page (e.g., a home page associated with a particular content sharing service, a home page associated with a particular user account on a social networking service, and/or any other suitable web page).

Process 300 can determine information indicating a user context associated with the user device at 304. In some embodiments, the user context can indicate any suitable information. For example, in some embodiments, the user context can indicate a current activity and/or a current location associated with the user device. As a more particular example, the current activity and/or the current location can indicate whether a user associated with the user device is currently traveling and/or commuting, currently moving in a particular type of vehicle (e.g., in a car, on a train, on a bike, and/or in any other suitable type of vehicle), currently walking, currently in a meeting, currently in a particular venue (e.g., in a particular restaurant, at a sporting event, and/or any other suitable type of venue), and/or in any other suitable type of location. Process 300 can determine the current activity and/or the current location using any suitable technique or combination of techniques. For example, in some embodiments, process 300 can determine the current location based on Global Positioning System (GPS) coordinates associated with the user device and/or any other suitable location information from the user device. As another example, in some embodiments, process 300 can determine the current activity based on calendar information stored on the user device.

As another example, in some embodiments, the user context can indicate a state of the user device. As a more particular example, in some embodiments, the state of the user device can indicate whether headphones are currently being used with the user device. As another more particular example, in some embodiments, the state of the user device can indicate a current battery life of the user device (e.g., 20% of the battery remaining, 50% of the battery remaining, 4 hours of use remaining, and/or any other suitable battery life information).

As another example, in some embodiments, the user context can indicate user preferences for content for a user associated with the user device. As a more particular example, the user preferences can include a type of content the user prefers to view (e.g., movies, television shows, music videos, live streaming content, audiobooks, and/or any other suitable types of content), a genre of content the user prefers to view (e.g., documentaries, news programs, dramas, thrillers, and/or any other suitable genre of content), topics associated with content the user prefers to view (e.g., names of particular television programs, names of particular content channels, interests and/or hobbies, and/or any other suitable topics), durations of content the user prefers (e.g., short video clips, video content less than thirty minutes long, and/or any other suitable durations), and/or any other suitable user preferences. Process 300 can determine the user preferences based on any suitable information, such as information associated with a user account for a particular content sharing system authenticated on the user device.

Note that, in instances where information about a user's location, activities, and/or content preferences are used, consent to use this information can be requested from the user. For example, in some embodiments, permission to use different types of information can be granted by a user through a user interface allowing the user to set and/or modify various settings. In some such embodiments, the settings can be modified and/or updated at any suitable time(s).

Process 300 can determine network connectivity information associated with the user device at 306. The network connectivity information can indicate any suitable information about a current connection of the user device to a communication network, such as communication network 106. For example, in some embodiments, the network connectivity information can indicate a type of connection between the user device and the communication network (e.g., a 3G connection, a 4G connection, a WiFi connection, a dial-up connection, a DSL connection, and/or any other suitable type of connection), a bandwidth and/or a connection speed (e.g., in bits/second, Mbits/second, Gbits/second, and/or any other suitable metric), a reliability of the connection of the user device to the communication network, and/or any other suitable network connectivity information. Process 300 can determine the network connectivity information using any suitable technique or combination of techniques. For example, in some embodiments, data server 104 can transmit a message to the user device and can determine the network connectivity information based on a response received from the user device.

Note that, in some embodiments, process 300 can update the network connectivity information at any suitable time and/or at any suitable time intervals. For example, in some embodiments, process 300 can determine the network connectivity information at set time intervals (e.g., every minute, every five minutes, and/or any other suitable time intervals). As another example, in some embodiments, process 300 can update the network connectivity information in response to determining that a particular event has occurred (e.g., that a browser on the user device has navigated to a new page, that a particular application has been opened, and/or any other suitable event). In some embodiments, process 300 can use the updated network connectivity information in any suitable manner, for example, by using the most recently determined network connectivity information to identify suitable content items.

At 308, process 300 can identify and score a group of content items based on the user context and the network connectivity information. Process 300 can identify the group of content items using any suitable technique or combination of techniques. For example, in some embodiments, process 300 can identify a group of content items associated with a particular type of content and/or a particular genre of content indicated in a group of user preferences, as described above in connection with block 304. Process 300 can then score each of the content items based on the network connectivity information using any suitable technique or combination of techniques. For example, in some embodiments, process 300 can score the content items based on a speed and/or or a type of a connection of the user device to a communication network. As a more particular example, in instances where the speed and/or the type of the network connection indicates that the connection is a relatively lower speed connection (e.g., below a predetermined threshold of download speed, and/or any other suitable metric) or a relatively less-reliable connection (e.g., based on information indicating that a user is on a subway train, based on information indicating that the user is connecting and disconnecting from the communication network frequently, and/or any other suitable information), process 300 can determine that content items that would not benefit from relatively higher audio and/or video resolution should be scored higher. As another more particular example, in instances where the speed and/or the type of the network information indicates that the connection is a relatively higher speed connection (e.g., above a predetermined threshold of download speed, and/or any other suitable metric), or a relatively reliable connection (e.g., based on information indicating that the user device is connected to a user's home or office network, and/or any other suitable information), process 300 can determine that content items that would benefit from relatively higher audio and/or video resolution (e.g., a larger number of pixels, a larger number of frames per second, a larger number of samples per second, and/or any other suitable metric) should be scored higher. In some embodiments, the score can indicate any suitable metric or information about the content item, such as a predicted duration of time the user would view the content item if it were presented (e.g., as shown in and described below in connection with FIG. 4), a likelihood the user would enjoy the content item, a likelihood the user would endorse and/or share the content item on a social networking site, and/or any other suitable metric.

In some embodiments, process 300 can score the group of content items based on the user context information. For example, in some embodiments, process 300 can score each content item in the group of content items based on a suitability for viewing while the user is in the current location and/or performing the current activity determined at block 304. As a more particular example, if process 300 determined that a user of the user device is currently commuting (e.g., by car, bike, etc.), process 300 can determine that content items that are likely to be less enjoyable without viewing accompanying video content (e.g., television programs, movies, and/or any other suitable type of content) are to be scored lower than content items that are likely to be enjoyed without viewing video content (e.g., audio books, radio programs, music videos, and/or any other suitable type of content). As another more particular example, if process 300 determined that a current battery life of the user device is below a predetermined threshold, process 300 can score content items with a relatively shorter duration higher than content items with a relatively longer duration. As another example, in some embodiments, process 300 can score each content item in the group of content items based on user preferences indicated in the user context information. As a more particular example, in some embodiments, process 300 can score content items that are associated with topics and/or content creators a user of the user device has indicated they enjoy higher than other content items in the group of content items Note that, in some embodiments, each content item can be associated with multiple scores, for example a first score based on the network connectivity (e.g., indicating content items most suited for presentation on the user device based on the current network connection) and a second score based on the user context (e.g., indicating content items most likely to be of interest to a user of the user device based on user preferences). In some such embodiments, process 300 can combine the multiple scores in any suitable manner. For example, in some embodiments, process 300 can combine the multiple scores using a weighted average, and each score can be weighted using any suitable factor. In some embodiments, a factor associated with a score can be updated and/or modified over time based on user feedback. For example, in some embodiments, in instances where process 300 causes a particular content item to be ranked highly but the content item is not selected by a user of the user device after the content item is recommended to the user, process 300 can modify weights associated with each of multiple factors.

Process 300 can cause a subset of the group of content items to be presented as content recommendations on the user device based on the score at 310. For example, in some embodiments, process 300 can rank the content items in the group of content items based on the score and can cause the top N content items in the group of content items to be selected for recommendation to a user of the user device. The recommendations can be presented in any suitable manner. For example, in some embodiments, process 300 can cause the content recommendations to be presented in a user interface on the user device. In some such embodiments, each recommended content item can be presented with any suitable information, such as a name of the content item, a creator of the content item, a date the content item was published and/or created, a number of times the content item has been viewed and/or shared, and/or any other suitable information. Additionally or alternatively, each content item can be presented with an image, animation, icon, graphic, and/or any other suitable content associated with the content item. In some embodiments, selection of a particular content item can cause the content item to begin being presented on the user device. In some embodiments, any suitable number (e.g., one, two, five, ten, twenty, and/or any other suitable number) of content items can be recommended. In some embodiments, the recommended content items can be arranged in any suitable manner, such as in a row, in a column, in a scrolling carousel, and/or in any other suitable manner.

Figure 4:
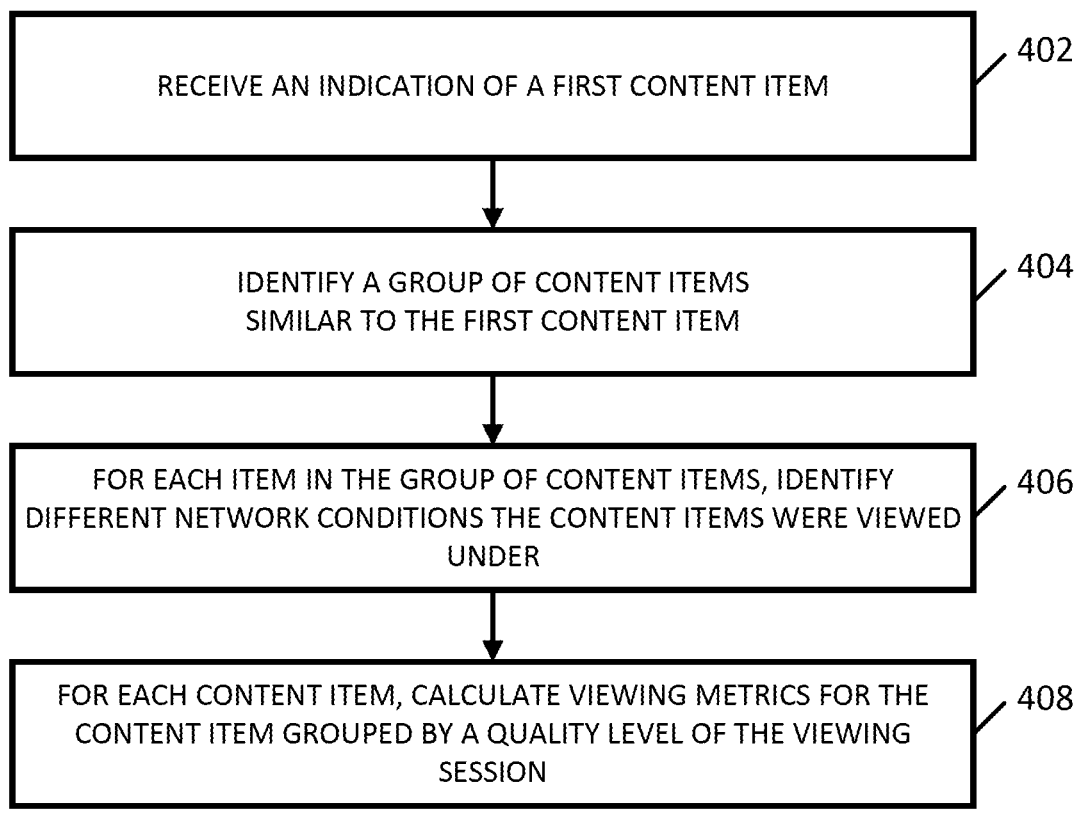
FIG. 4 shows an example of a process for selecting an optimal quality level for a content item based on network connectivity information in accordance with some embodiments of the disclosed subject matter.

Turning to FIG. 4, an example 400 of a process for scoring content items based on network connectivity information is shown in accordance with some embodiments of the disclosed subject matter. In some embodiments, blocks of process 400 can be implemented on data server 104. Note that, in some embodiments, the blocks of process 400 can performed at any suitable time. For example, in some embodiments, data server 104 can perform blocks of process 400 to score a group of content items based on network connectivity information and can save the calculated scores for later use, for example, when identifying content to recommend to a user of a user device.

Process 400 can begin by receiving an indication of a first content item at 402. Process 400 can receive the indication of the first content item based on any suitable information. For example, in some embodiments, the first content item can be the first content item in a group of content items that process 400 is iterating through and scoring. As another example, in some embodiments, the first content item can correspond to a candidate content item for recommendation on a user device, as described above in connection with FIG. 3.

Process 400 can identify a group of content items similar to the first content item at 404. The group of content items can be identified using any suitable information and any technique(s). For example, in some embodiments, the group of content items can include content items identified to be created by the same content creator as the first content item and/or belonging to the same aggregation of content items (e.g., a playlist of content items, a channel of content items, and/or any other suitable aggregation of content items) as the first content item. As another example, in some embodiments, the group of content items can include content items associated with similar topics and/or keywords as the first content item. As yet another example, in some embodiments, the group of content items can be identified based on information indicating content items typically viewed before and/or after the first content item. As still another example, in some embodiments, the group of content items can include content items that are typically returned in response to a search query about the first content item and/or a topic associated with the first content item. In some embodiments, the group of content items similar to the first content item can include any suitable number (e.g., one, five, ten, twenty, fifty, and/or any other suitable number) of content items.

At 406, process 400 can identify different network conditions each content item in the group of content items was viewed under. As described above in connection with FIG.

3, the network conditions can indicate a type of connection that was used to stream the content item, a bandwidth of the connection that was used to stream the content item, a speed of the connection that was used to stream the content item, and indication of the reliability of the connection that was used to stream the content item, and/or any other suitable information. In some embodiments, each content item may have been viewed multiple times by multiple user devices, and process 300 can identify any suitable number (e.g., one, two, five, ten, fifty, and/or any other suitable number) of viewing sessions and associated network conditions.

Process 400 can calculate estimated viewing metrics for the first content item for multiple different network conditions at 408. In some embodiments, the different network conditions can include any suitable connection types or connection speeds, such as a 3G connection, a 4G connection, a download speed within a particular range, and/or any other suitable connection information. For each different network condition, process 400 can aggregate viewing metrics for content items that were viewed under that network condition. For example, in some embodiments, process 400 can identify a subset of content items from the group of content items related to the first content item that were viewed under a particular network condition, and can aggregate viewing metrics (e.g., from multiple user devices) for the subset of content items. In some embodiments, the viewing metrics can include any suitable information, such as a duration of a content item that was viewed (e.g., a minute of the content item, five minutes of the content item, and/or any other suitable duration), a proportion of the content item that was viewed (e.g., 20%, 50%, 80%, and/or any other suitable proportion), a proportion of users that viewed the content item in its entirety, a proportion of users that navigated away from the content item within a predetermined duration of presentation of the content item beginning, and/or any other suitable viewing metric. Process 400 can then calculate viewing metrics for each network condition. For example, in some embodiments, process 400 can determine that for content items similar to the first content item when viewed with a 3G connection, an average (over multiple content items and multiple user devices) of 40% of the content item is viewed. As another example, in some embodiments, process 400 can determine that for content items similar to the first content item when viewed with a DSL connection, an average (over multiple content items and multiple user devices) of 90% of the content item is viewed.

It should be noted that, in some embodiments, process 400 can determine normalized viewing metrics. For example, for each type of content item, process 400 can determine that a particular proportion of the content item was viewed (e.g., 20%) across multiple network conditions. Process 400 can then determine that consuming the particular proportion of the content item is deemed normal. In continuing this example, content items of the particular type of content item can be recommended for consumption on a user device having any of the multiple different network conditions.

Process 400 can select an optimal quality level for the first content item based on the viewing metrics calculated at block 408. For example, in instances where more than a predetermined portion (e.g., more than 50%, more than 70%, and/or any other suitable portion) of the related content items were viewed (e.g., before presentation of the content item was stopped by the user) even if the content items were presented with relatively poor video resolution (e.g., a smaller number of pixels, a relatively lower number of frames per second, a relatively lower number of samples per second, and/or any other suitable metric), process 400 can determine than a relatively poor video resolution is suitable for the first content item. Process 400 can therefore cause the first content item to be recommended on user devices with a relatively poor network connection (e.g., a relatively small bandwidth, a relatively slow download speed, and/or any other suitable metrics). As another example, in instances where less than a predetermined portion (e.g., less than 50%, less than 30%, and/or any other suitable portion) of the related content items were viewed (e.g., before presentation of the content item was stopped by the user) when the content items were presented with relatively poor video resolution, but a higher proportion of the content items were viewed (e.g., before presentation of the content item was stopped by the user) when presented with higher video resolution (e.g., a larger number of pixels, a larger number of frames per second, a larger number of samples per second, and/or any other suitable metric), process 400 can determine that a higher video resolution for the first content item is optimal. Process 400 can therefore cause the first content item to be recommended on user devices with better network connections (e.g., a relatively high bandwidth, a relatively fast download speed, and/or any other suitable metrics).

In some embodiments, process 400 can store the selected quality level in association with an identifier of the first content item, for example, in memory 204 of data server 104. The quality level can then be retrieved at any suitable time, for example, in response to a request for content items that are suitable for viewing at a particular quality level.

Figure 5:
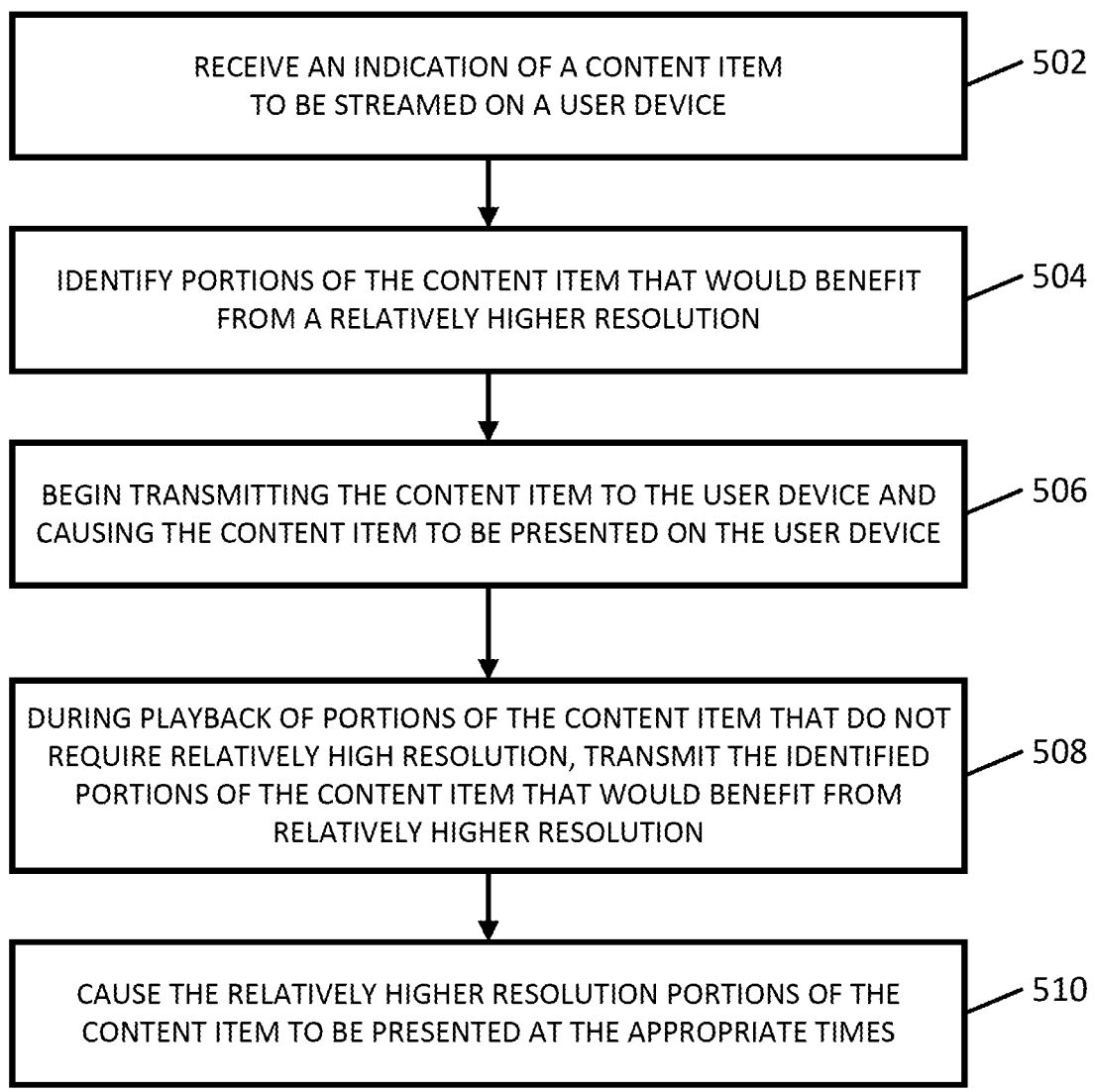
FIG. 5 shows an example of a process for modifying a quality level of a streamed content item in accordance with some embodiments of the disclosed subject matter.

Turning to FIG. 5, an example 500 of a process for adaptively streaming a content item to a user device is shown in accordance with some embodiments of the disclosed subject matter.

Process 500 can begin by receiving an indication of a content item to be streamed on a user device at 502. The indication can be received based on any suitable information. For example, in some embodiments, the indication can be received based on a determination that the content item was selected for presentation on the user device.

Process 500 can identify portions of the content item that would benefit from a relatively higher resolution (e.g., a larger number of pixels, a larger number of frames per second, a larger number of samples per second, and/or any other suitable metric) at 504. For example, in instances where the content item includes a commercial and other video content, process 500 can determine that the video content other than the commercial would benefit from relatively higher video resolution (e.g., a larger number of pixels, a larger number of frames per second, and/or any other suitable metric of resolution). As another example, in instances where the content item is a recording of a concert, process 500 can determine that portions of the content item that include video of the audience would benefit from relatively higher video resolution than portions of the content item that include other video content.

Process 500 can identify the portions of the content item that would benefit from higher resolution using any suitable information and technique or combination of techniques. For example, in some embodiments, process 500 can identify transitions between scenes (e.g., between a commercial and a program, between a view of an audience and a view of an orchestra, and/or any other suitable scene transitions) and can then identify a suitable quality level for the different scenes. As another example, in some embodiments, process 500 can use any suitable image analysis techniques to identify portions of the content item that are likely to contain content a user would be particularly interested in (e.g., scenes with particular characters, scenes with more than a predetermined amount of motion, and/or any other suitable scenes). As yet another example, in some embodiments, process 500 can analyze captions associated with the content item to identify portions of the content item that contain applause, laughter, and/or any other noises and can determine that those portions can be presented with a relatively lower resolution.

In some embodiments, process 500 can create a recipe file that indicates multiple portions of a content item and a resolution for each portion of the content item. For example, in some embodiments, the recipe file can indicate that a first portion of the content item (e.g., the first 100 frames, the first three minutes, and/or any other suitable portion) is to be presented with a relatively lower resolution and that a second portion of the content item (e.g., frames 101-200, time 3:01-7:00, and/or any other suitable portion) is to be presented with a relatively higher resolution. In some embodiments, the recipe file can additionally or alternatively indicate locations for files corresponding to the content item at the selected resolution(s). In some embodiments, process 500 can then use the recipe file to transmit the different portions of the content items at the indicated resolutions, for example, as described below in connection with block 506.

Process 500 can begin transmitting the content item to the user device and causing the content item to be presented on the user device at 506. In some embodiments, process 500 can stream the content item to the user device via communication network 106. In some embodiments, the content item can be transmitted with instructions that cause the content item to be presented on the user device, for example, in a video player window in a user interface on the user device.

At 508, process 500 can transmit higher resolution content (e.g., higher spatial resolution, higher temporal resolution, and/or any other suitable type of resolution) corresponding to the identified portions of the content item that would benefit from relatively higher resolution during playback of the lower resolution portions of the content item. In some embodiments, process 500 can cause the higher resolution content to be transmitted and stored (e.g., in memory 204 on user device 108) during playback of lower resolution content, thereby more effectively using the bandwidth of the connection. Note that, in some embodiments, process 500 can cause portions of the content that would benefit from relatively higher resolution to be transmitted concurrently with portions of the content item that would be suitable for presentation with lower resolution. For example, in instances where a particular amount of bandwidth is unallocated and/or unused by the transmission of the lower resolution portions of the content item, process 500 can cause at least a subset of the higher resolution portions of the content item to be concurrently transmitted to the user device, thereby more effectively using the bandwidth of the connection. In some embodiments, the higher resolution portions of the content item can occur after the lower resolution portions of the content item, and the higher resolution portions of the content item can then be stored on user device 108 for presentation at the appropriate time.

Note that, in some embodiments, process 500 can determine whether and how much of the identified portions of content to transmit based on viewing metrics associated with the media content item being transmitted. For example, in some embodiments, the viewing metrics can indicate an average portion (e.g., 20% of the media content item, 50% of the media content item, and/or any other suitable portion) of the media content item that was viewed across multiple users in multiple viewing sessions before presentation of the media content item was stopped. As a more particular example, in some embodiments, process 500 can determine the identified portions of content are not to be transmitted if they occur at a point in the content item past the portion of the content item that the average viewer stops viewing the content item at. As a specific example, if the identified portion of content item that would benefit from relatively higher resolution occurs halfway through the content item but the viewing metrics associated with the content item indicate that a majority of viewers navigate away from the content item after viewing only 20% of the content item, process 500 can determine that the portion of the content item that would benefit from higher resolution is not to be transmitted until it is more likely that the viewer will continue watching the content item through to the identified portion.

In some embodiments, process 500 can then cause the relatively higher resolution content to be presented at the appropriate times at 510. For example, in instances where the higher resolution content includes multiple streams of content, process 500 can cause the streams of content to be combined prior to presenting the content.

It should be understood that at least some of the above described blocks of the processes of FIGS. 3-5 can be executed or performed in any order or sequence not limited to the order and sequence shown in and described in the figure. Also, some of the above blocks of the processes of FIGS. 3-5 can be executed or performed substantially simultaneously where appropriate or in parallel to reduce latency and processing times. Additionally or alternatively, some of the above described blocks of the processes of FIGS. 3-5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for recommending content based on network conditions are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for adaptively streaming a content item, the method comprising:
   receiving an indication of a video content item to be streamed on a user device;
   in response to receiving the indication, determining a current user activity, a current location associated with the user device, and network connectivity information associated with a connection status of the user device over a communications network;
   analyzing captions associated with the video content item to identify particular audio content included in the video content item;
   identifying a first portion of the video content item that is to be presented with a first video resolution based on the current user activity, the current location, and the network connectivity information, and further based on analyzing the captions and identifying the particular audio content included in the first portion of the video content item;
   identifying a second portion of the video content item that is to be presented with a second video resolution based on the current user activity, the current location, and the network connectivity information, wherein the first video resolution is lower than the second video resolution;
   transmitting the first portion of the video content item to the user device;
   while causing the first portion of the video content item to be presented on the user device and at a time when a user of the user device is likely to continue viewing the video content item through the second portion, transmitting the second portion of the video content item to the user device; and
   causing the second portion of the video content item to be presented on the user device.

2. The method of claim 1, wherein identifying the first portion of the video content item that is to be presented with the first video resolution and identifying the second portion of the video content item that is to be presented with the second video resolution is based on visual content of the first portion of the video content item and the second portion of the video content item.

3. The method of claim 2, further comprising identifying a scene transition within the video content item, wherein the first portion of the video content item and the second portion of the video content item are separated by the scene transition.

4. The method of claim 1, wherein identifying the second portion of the video content item that is to be presented with the second resolution is based on the analyzing of the captions associated with the content item.

5. The method of claim 1, further comprising:
   identifying a subset of the second portion of the video content item to be transmitted to the user device based on viewing metrics associated with the video content item,
   wherein the viewing metrics include an average portion of the video content item that was presented on a plurality of user devices other than the user device before presentation of the video content item was stopped.

6. The method claim 1, further comprising creating a file that indicates a first location of the first portion of the video content item at the first video resolution and a second location of the second portion of the video content item at the second video resolution, wherein the transmitting the first portion of the video content item to the user device and the transmitting the second portion of the video content item to the user device is based on the created file.

7. The method of claim 1, wherein identifying the first portion of the video content item that is to be presented with a first video resolution based on analyzing the captions and identifying the particular audio content included in the first portion of the video content item includes:
   determining that the particular audio content included in the video content item corresponds to a particular noise; and
   identifying the first portion of the video content item based on determining that the first portion of the video content item includes the particular audio content that corresponds to the particular noise.

8. A system for adaptively streaming a content item, the system comprising:
   a hardware processor that is configured to:
     receive an indication of a video content item to be streamed on a user device;
     in response to receiving the indication, determine a current user activity, a current location associated with the user device, and network connectivity information associated with a connection status of the user device over a communications network;
     analyze captions associated with the video content item to identify particular audio content included in the video content item;
     identify a first portion of the video content item that is to be presented with a first video resolution based on the current user activity, the current location, and the network connectivity information, and further based on analyzing the captions and identifying the particular audio content included in the first portion of the video content item;
     identify a second portion of the video content item that is to be presented with a second video resolution based on the current user activity, the current location, and the network connectivity information, wherein the first video resolution is lower than the second video resolution;
     transmit the first portion of the video content item to the user device;
     while causing the first portion of the video content item to be presented on the user device and at a time when a user of the user device is likely to continue viewing the video content item through the second portion, transmit the second portion of the video content item to the user device; and
     cause the second portion of the video content item to be presented on the user device.

9. The system of claim 8, wherein identifying the first portion of the video content item that is to be presented with the first video resolution and identifying the second portion of the video content item that is to be presented with the second video resolution is based on visual content of the first portion of the video content item and the second portion of the video content item.

10. The system of claim 9, wherein the hardware processor is further configured to identify a scene transition within the video content item, wherein the first portion of the video content item and the second portion of the video content item are separated by the scene transition.

11. The system of claim 8, wherein identifying the second portion of the video content item that is to be presented with the second video resolution is based on the analyzing of the captions associated with the video content item.

12. The system of claim 8, wherein the hardware processor is further configured to:
identify a subset of the second portion of the video content item to be transmitted to the user device based on viewing metrics associated with the video content item, wherein the viewing metrics include an average portion of the video content item that was presented on a plurality of user devices other than the user device before presentation of the video content item was stopped.

13. The system claim 8, wherein the hardware processor is further configured to create a file that indicates a first location of the first portion of the video content item at the first video resolution and a second location of the second portion of the video content item at the second video resolution, wherein the transmitting the first portion of the video content item to the user device and the transmitting the second portion of the video content item to the user device is based on the created file.

14. The system of claim 8, wherein the hardware processor is configured to identify the first portion of the video content item that is to be presented with a first video resolution based on analyzing the captions and identifying the particular audio content included in the first portion of the video content item by at least being configured to:
determine that the particular audio content included in the video content item corresponds to a particular noise; and
identify the first portion of the video content item based on determining that the first portion of the video content item includes the particular audio content that corresponds to the particular noise.

15. A non-transitory computer-readable medium containing computer executable instructions that, when executed by a processor, cause the processor to:
review an indication of a video content item to be streamed on a user device;
in response to receiving the indication, determine a current user activity, a current location associated with the user device, and network connectivity information associated with a connection status of the user device over a communications network;
analyze captions associated with the video content item to identify particular audio content included in the video content item;
identify a first portion of the video content item that is to be presented with a first video resolution based on the current user activity, the current location, and the network connectivity information, and further based on analyzing the captions and identifying the particular audio content included in the first portion of the video content item;
identify a second portion of the video content item that is to be presented with a second video resolution based on the current user activity associated with the user device, the current location, and the network connectivity information, wherein the first video resolution is lower than the second video resolution;
transmitting the first portion of the video content item to the user device;
while causing the first portion of the video content item to be presented on the user device and at a time when a user of the user device is likely to continue viewing the video content item through the second portion, transmit the second portion of the video content item to the user device; and
cause the second portion of the video content item to be presented on the user device.

16. The non-transitory computer-readable medium of claim 15, wherein the instructions further cause the processor to identify the first portion of the video content item that is to be presented with the first video resolution and the second portion of the video content item that is to be presented with the second video resolution based on visual content of the first portion of the video content item and the second portion of the video content item.

17. The non-transitory computer-readable medium of claim 16, wherein the instructions further cause the processor to:
identify a scene transition within the video content item, wherein the first portion of the video content item and the second portion of the video content item are separated by the scene transition.

18. The non-transitory computer-readable medium of claim 15, wherein the instructions further cause the processor to identify the second portion of the video content item that is to be presented with the second video resolution based on the analyzing of the captions associated with the video content item.

19. The non-transitory computer-readable medium of claim 15, wherein the instructions further cause the processor to:
identify a subset of the second portion of the video content item to be transmitted to the user device based on viewing metrics associated with the video content item, wherein the viewing metrics include an average portion of the video content item that was presented on a plurality of user devices other than the user device before presentation of the video content item was stopped.

20. The non-transitory computer-readable medium claim 15, wherein the instructions further cause the processor to:
create a file that indicates a first location of the first portion of the video content item at the first video resolution and a second location of the second portion of the video content item at the second video resolution, wherein causing the processor to transmit the first portion of the video content item to the user device and causing the processor to transmit the second portion of the video content item to the user device are based on the created file.

21. The non-transitory computer-readable medium claim 15, wherein the instructions further cause the processor to identify the first portion of the video content item that is to be presented with a first video resolution based on analyzing the captions and identifying the particular audio content included in the first portion of the video content item based on causing the processor to:

determine that the particular audio content included in the video content item corresponds to a particular noise; and identify the first portion of the video content item based on determining that the first portion of the video content item includes the particular audio content that corresponds to the particular noise.

* * * * *